United States Patent [19]

Ikemori

[11] 4,291,951
[45] Sep. 29, 1981

[54] COMPACT TYPE RETROFOCUS LENS
[75] Inventor: Keiji Ikemori, Yokohama, Japan
[73] Assignee: Canon Kabushiki Kaisha, Tokyo, Japan
[21] Appl. No.: 102,538
[22] Filed: Dec. 11, 1979
[30] Foreign Application Priority Data
Dec. 15, 1978 [JP] Japan ................. 53-156101
[51] Int. Cl.³ ............................. G02B 13/04
[52] U.S. Cl. ................................. 350/458
[58] Field of Search ................. 350/458, 463
[56] References Cited
U.S. PATENT DOCUMENTS
4,188,092  2/1980  Momiyama .................. 350/463
4,206,973  6/1980  Ikemori ..................... 350/463 X Primary Examiner—John K. Corbin
Assistant Examiner—Scott J. Sugarman
Attorney, Agent, or Firm—Toren, McGeady and Stanger

[57] ABSTRACT

Disclosed is an inverted telephoto lens consisting of a divergent lens group, a convergent lens group, a diaphragm, a positive doublet lens, a bi-concave lens and two positive meniscus lenses in sequence from the object side. The positive doublet lens consists of a negative lens and a bi-convex lens cemented to each other, while the divergent lens consists of a positive lens, a negative meniscus lens, a positive lens and a negative lens whose rear lens surface is concave in sequence.

2 Claims, 27 Drawing Figures

COMPACT TYPE RETROFOCUS LENS

BACKGROUND OF THE INVENTION

The present invention relates to an inverted telephoto lens.

Quite recently, of the interchangeable lenses for the 35 mm single lens reflex camera, there has been a tendency to make the wide angle lens, in particular, compact. On the other hand, for the wide angle lens for the single lens reflex camera, the inverted telephoto type lens is widely used, whereby a comparatively long back focus cn be obtained with this type of lens, which is advantageous. The lens system, however, is a symmetrical so that there are many difficulties in aberration correction.

Especially when the inverted telephoto type wide angle lens is made compact, what is most difficult is the correction of the distortion taking place in the divergent lens at the object side. For this aberration correction, it is effective to provide a positive lens in the divergent lens. In this respect, there are two representative constructions, namely the one where a negative lens is provided at the object side and a positive lens is provided behind the negative lens and the other where a positive lens and a negative lens are provided in sequence. When the above both constructions are compared with each other, the incident height and the incident angle of the axial light beam incident upon the positive lens effective for the distortion correction are large so that a larger correction effect for the distortion is obtained when the positive lens is provided frontmost in such a manner that it is effective to obtain a good correction with small total length.

However, when a positive lens is provided at the object side, the refractive force of the negative lens next to the positive lens becomes very strong so that the sagittal flare is greatly produced at this part, which phenomenon becomes very pronounced as the picture angle is increased. Further, the light beam out of the optical axis is refracted strongly with the positive lens so that it is pointed out that the lateral chromatic aberration has a tendency to become inferior while the diameter of the front lens has the tendency to become large.

The present assignee proposed with U.S. Patent Application Ser. No. 892,422 filed Mar. 31, 1978, now U.S. Pat. No. 4,188,092, an inverted telephoto type wide angle lens whose frontmost lens has a positive power in order to make the diameter of the frontmost lens smaller. As an embodiment of the above application, a lens having a picture angle of 84°, whose total length is 2.25 times as long as the focal length and whose F.No. is 1:2.0 is mentioned.

Following the above application, the present inventors proposed with Ser. No. 931,255 now U.S. Pat. No. 4,206,973 an inverted telephoto type lens whose total length is smaller though the F.No. is larger than that of the above embodiment.

SUMMARY OF THE INVENTION

A purpose of the present invention is to offer a compact and wide angle inverted telephoto lens.

A second purpose of the present invention is to offer an inverted telephoto lens whose aberrations, particularly the distortion, the astigmatism and the lateral chromatic aberration are well corrected and whose sagittal flare is satisfactorily eliminated.

In the case of the present invention, the object side positive lens next to the diaphragm of the inverted telephoto lens is composed of a doublet lens with a cemented surface concave toward the object and having a convergent effect in order to eliminate especially the sagittal flare.

DETAILED DESCRIPTION OF THE PREFERRED EMBODIMENTS

A most preferred embodiment of the lens in accordance with the present invention consists of the first positive meniscus lens having a convex surface at the object side, the second negative meniscus lens having a convex surface at the object side, the third positive lens, the fourth negative lens, the fifth bi-convex lens, the radius of curvature of whose lens surface at the object side is smaller, the aperture, the sixth combined positive lens which has a convex surface with a convergent effect at the object side and the radius of curvature of whose lens surface at the image side is smaller, the seventh bi-concave lens, the radius of curvature of whose lens surface at the object side is smaller, the eighth positive meniscus lens having a concave surface at the object side and the ninth positive meniscus lens having a concave surface at the object side in sequence from the object side, whereby the sign of the radius of curvature of the image side lens surface of the third lens is the same as that of the object side lens surface.

By constituting the divergent lens group at the object side with a positive lens, a negative lens, a positive lens and a negative lens in sequence in the above mentioned way, the distortion and the astigmatism are well corrected at the same time, which has so far been considered difficult. Further, by providing an aperture between the fifth and the sixth lens for forming the divergent light beam, a compact lens is realized as is explained later.

Particularly, by providing in the sixth lens a cemented plane with the convex surface at the object side having a convergent efficiency, the sagittal flare is effectively eliminated.

Further, it is very effective to converge the light beam gradually that the object side surface of the sixth lens on which the divergent light beam is incident is made convex toward the object so as to be a convergent surface, while it is desirable for the correction of the aberrations of the lens such as of F.No. 2.8 that the object side surface of the ninth lens is made concave toward the object.

Further, when the following relations are established, a compact wide angle lens with high efficiency can be realized.

(1) $FI < 0,\ 0.5F \leq |FI| \leq 0.75F$ (2) $FII < 0$, $2.5F \leq |FII| \leq 4.5F$ (3) $0.32 \leq \dfrac{D9 + D11 + D12}{L} \leq 0.44$ (4) $0 < \left|\dfrac{1}{R13}\right| - \left|\dfrac{1}{R14}\right| \leq \dfrac{0.18}{F}$ (5) $0.02F \leq D13 \leq 0.1F$ (6) $\dfrac{0.015}{F} \leq \dfrac{N7 - N6}{R12} \leq \dfrac{0.135}{F}$ (7) $1.68 \leq N4$ (8) $48 \leq \nu 1 \cdot \nu 4 \cdot \nu 6$ and $\nu 7 \leq 63$ (9) $30 \leq \nu 2$ and $\nu 3 \leq 41$, $26 \leq \nu 5 \leq 32$ (10) $|\nu 6 - \nu 7| \leq 5$ Hereby, F is the focal length of the whole system, FI is the compound focal length of the first lens to the fourth lens, FII is the compound focal length of the first lens to the fifth lens, L is the total lens length from the object side surface of the first lens up to the image side surface of the ninth lens, D9 is the thickness of the fifth lens along the optical axis, D11+D12 is the thickness of the sixth combined lens along the optical axis, N4 is the refractive index (d line) of the fourth lens, N6 and N7 are respectively the refractive index (d line) of the negative lens and the positive lens in the sixth lens, D13 is the axial distance between the surface of the sixth and the seventh lens, $\nu 1$, $\nu 2$, $\nu 3$, $\nu 4$ and $\nu 5$ are the Abbe's number of the first, the second, the third, the fourth and the fifth lens, and $\nu 6$ and $\nu 7$ are the Abbe's number of the negative lens and the positive lens in the sixth lens.

With respect to the afore mentioned relations, the one (6) is the condition for the sixth lens having a cemented convergent surface to effectively correct the sagittal flare due to the inclined light beam with a large picture angle, while the one (10) is the condition for the sixth lens to remarkably well correct the lateral chromatic aberration, the longitudinal chromatic aberration and the spherical chromatic aberration.

Below, the meaning of each relation will be explained.

The relation (1) is the condition for securing a sufficient back focus even when the lens is applied to the single lens reflex camera, by raising the divergent degree of the first lens to the fourth lens to some extent, whereby the diameter of the front lens can be kept small. Beyond the upper limit value of the second condition of this relation, it is difficult to obtain a sufficient back focus as well as to keep the diameter of the front lens small, while beyond the lower limit value it is difficult to correct the aberration of the whole lens system because much spherical aberration of the higher harmonics takes place remarkably. The sagittal flare, in particular, is increased.

The relation (2) is the condition for making especially the total lens system compact, whereby at least it is necessary that the focal length (f1−f5) of the lens groups closer to the object than the aperture is negative. When the above condition is established, the angle between the inclined light beam passing through the aperture and the optical axis is smaller than that between the inclined light beam incident on the first surface and the optical axis, so that it is possible to decrease the height of the light beam with largest picture angle incident on the first surface. Thus, it becomes possible to make the effective diameters of the front lens, the second lens, the third lens and the fourth lens small, while the lens distances can be decreased, which makes it possible to realize a compact whole lens system. In this respect, beyond the upper limit value of the second condition of the relation (2), the above effect for realizing a compact system becomes small, whereby the diameter of the front lens and the whole lens length are increased. On the other hand, beyond the lower limit value, it is possible to make the diameter of the front lens small, while the diameter of the rear lens becomes remarkably large, whereby it is difficult to correct especially the spherical aberration and the coma satisfactorily.

The relation (3) is the condition for limiting the total lens length and the diameter of the front lens, making the whole lens system compact effectively and correcting especially the distortion and the astigmatism well. Namely, beyond the upper limit of this relation, it is possible to make the diameter of the front lens, while the total lens length becomes remarkably long or much negative distortion takes place. On the other hand, beyond the lower limit, the diameter of the front lens becomes remarkably large while much aberration of the higher degree takes place for the light beam out of the optical axis, so that it is difficult to correct the distortion and the astigmatism well at the same time.

The relations (4) and (5) are the conditions under which the part consisting of R13 and R14 (so-called air-lens) has at least a convergent effect so as to produce a certain aberration of the higher degree in order to correct well the spherical aberration in the diaphragm opened state and the sagittal flare of the marginal light beam.

Namely, the portion assumes a concentrical shape with the aperture so that the meridional ray of the marginal light beam is scarcely refracted, while the sagittal ray of the light beam on the optical axis and the circumference is greatly refracted in such a manner that the more distant it is from the optical axis the larger the spherical aberration is under-corrected. Beyond the upper limit of the relations (4) and (5) the spherical aberration of the third degree is greatly produced in this portion, whereby already in the neighborhood of the optical axis much under-correction takes place. Further it is difficult to obtain a necessary amount of the back focus. On the other hand, beyond the lower limit of the relations (4) and (5), the spherical aberration in the almost opened state is under-corrected and the sagittal flare of the marginal light beam cannot be corrected any more.

The relation (6) is the condition for effectively correcting the sagittal flare of the inclined light beam with large picture angle. Namely, the cemented surface of the sixth combined lens is positioned in the neighborhood of the aperture so that the astigmatism as well as the distortion is scarcely influenced, while when the refractive power on the cemented surface satisfies the relation, the spherical aberration is little influenced. Further, this surface is convex toward the aperture so that a large convergent effect is worked upon the marginal part of the sagittal ray of the inclined light beam with especially a large picture angle. Namely, beyond the upper limit value, the spherical aberration is also largely influenced, while beyond the lower limit the sagittal flare can hardly be corrected.

The relation (7) is the condition under which the aberration of the higher degree produced with the fourth lens with a high power is checked as much as possible, still enabling the aberration correction, whereby N4 is at least sequented to be larger than the value.

The relations (8), (9) and (10) are the conditions for correcting the lateral chromatic aberration, the longitudinal chromatic aberration and the spherical chromatic aberration remarkably well.

Namely, the kinds of glass are chosen in such a manner that the lateral chromatic aberration for the light beam with the middle picture angle to the largest picture angle is under-corrected (for example g line) with the first and the second lens but in as same amount as possible, while the lateral chromatic aberration (g line) is over corrected with the third to the sixth combined lens. As the result, the amount under-corrected with the first and the second lens is corrected to some extent with the amount over corrected with the third to the sixth combined lens so as to correct well the lateral chromatic aberration of the light beam with the middle picture angle to the largest picture angle. Further, the kinds of glass are chosen in such a manner that the longitudinal chromatic aberration and the spherical chromatic aberration produced with the fourth lens are as small as possible while the above aberrations are corrected to some extent with the third and the fifth lens.

Consequently, in order to correct well the lateral chromatic aberration, the longitudinal chromatic aberration and the spherical chromatic aberration well it is sufficient to choose low dispersion glass for the first positive lens, the fourth negative lens and the sixth positive combined lens and the high dispersion lens for the second negative lens, the third positive lens and the fifth positive lens.

Beyond the lower limit value of the relation (8) and the upper limit value of the relation (9) it is no longer easy to correct well all of the lateral chromatic aberration, the longitudinal chromatic aberration and the spherical chromatic aberration, whereby, when the longitudinal chromatic aberration and the spherical chromatic aberration are well corrected, the lateral chromatic aberration (g line) is remarkably undercorrected for the middle picture angle and over-corrected for the largest picture angle. Further, beyond the upper limit value of the relation (8) and the lower limit value of the relation (9), the longitudinal chromatic aberration (g line) is remarkably over-corrected while the spherical chromatic aberration is also remarkably over-corrected in the neighborhood of the totally opened state in order to correct well the lateral chromatic aberration.

The relation (10) is for limiting the difference between the Abbe's number of the lenses constituting the sixth lens, whereby when the absolute value of the difference is larger than 5, it is considerably difficult to correct well both of the lateral chromatic aberration and the longitudinal chromatic aberration.

Figure 1:
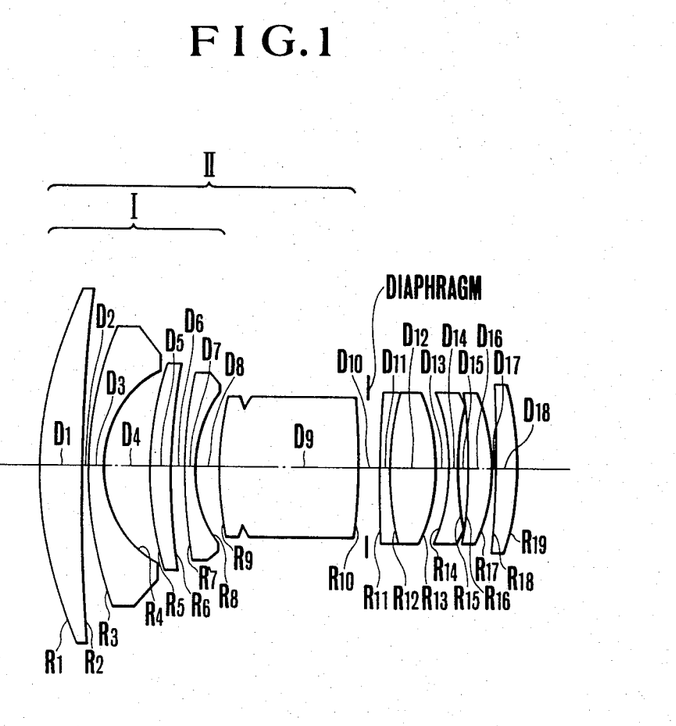
FIG. 1 shows the first embodiment of the lens in accordance with the present invention in section.
Figures 2A, 2B:
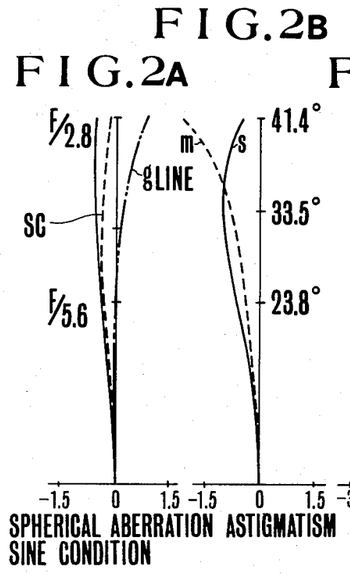
FIGS. 2(A) to (H) show aberrations of the first embodiment.
Figures 2C, 2D:
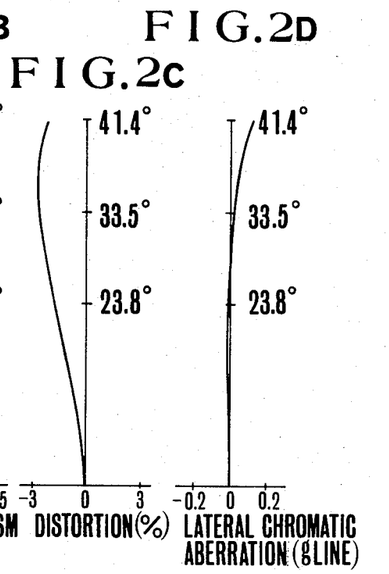
Figures 2E, 2F, 2G, 2H:
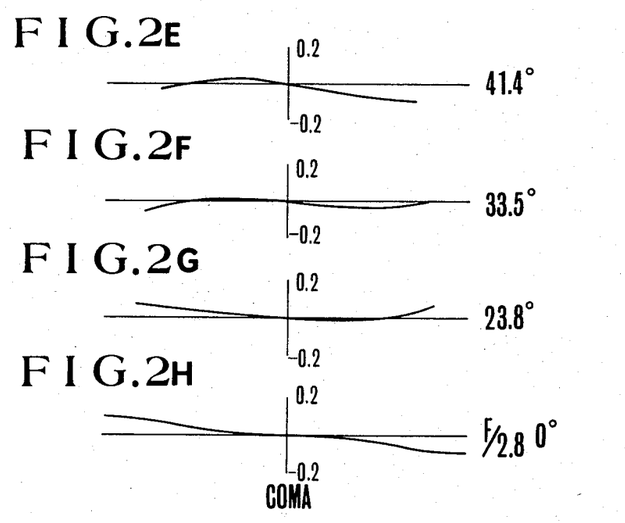
Figure 3:
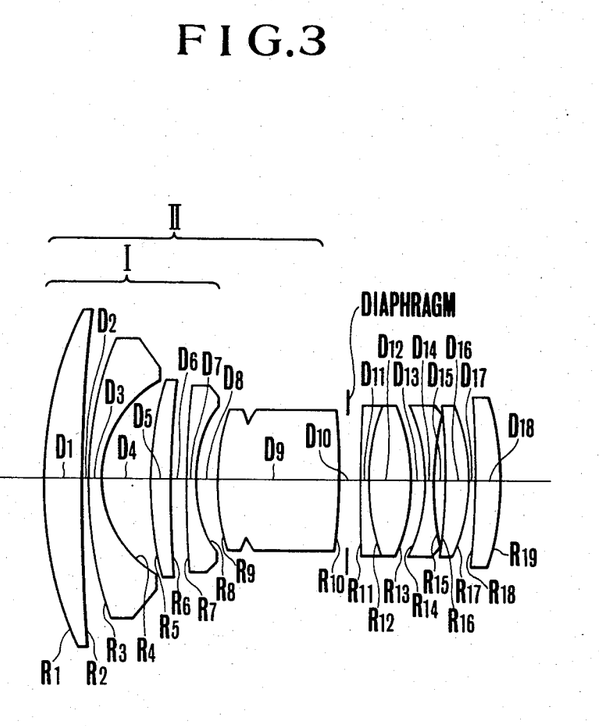
FIG. 3 shows the second embodiment of the lens in accordance with the present invention in section.
Figures 4A, 4B:
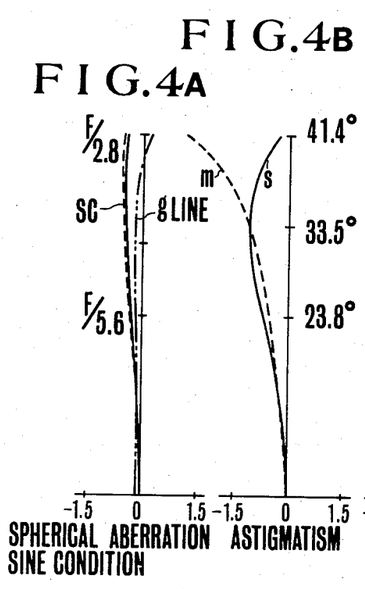
FIGS. 4(A) to (H) show aberrations of the second embodiment.
Figures 4C, 4D:
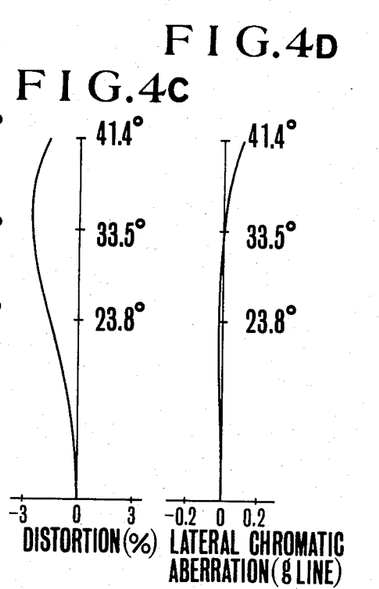
Figures 4E, 4F, 4G, 4H:
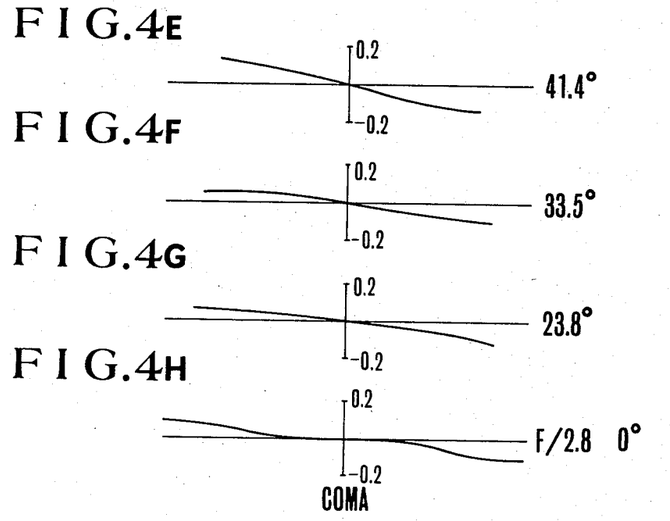
Figure 5:
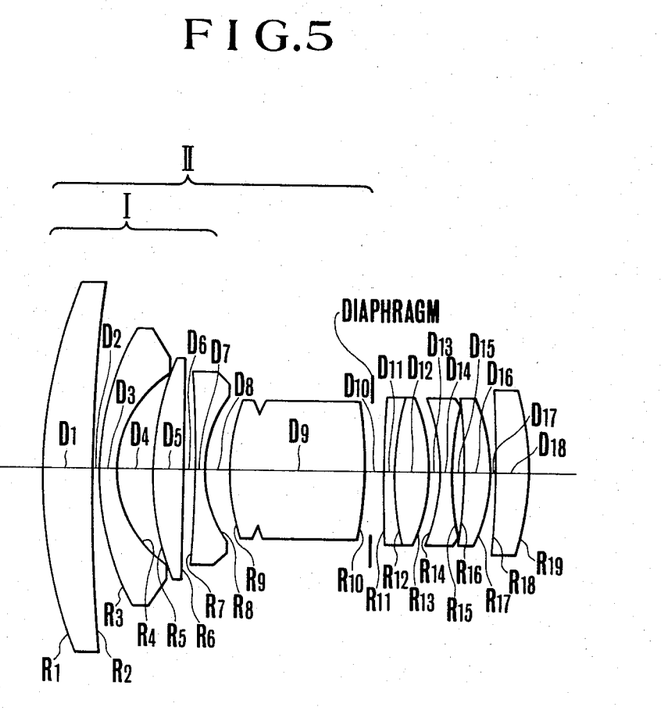
FIG. 5 shows the third embodiment of the lens in accordance with the present invention in section.
Figures 6A, 6B, 6C:
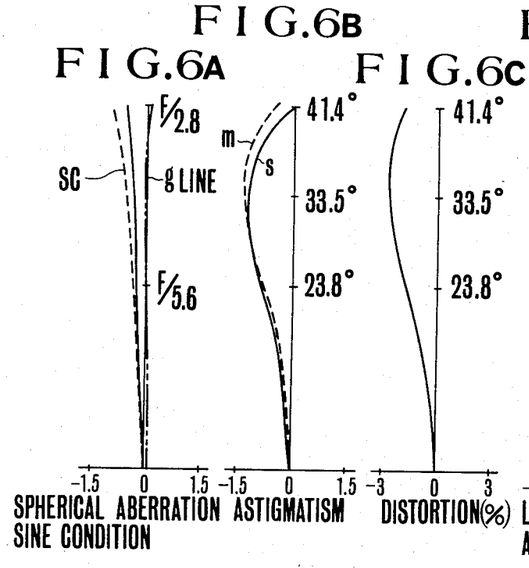
FIGS. 6(A) to (H) show aberrations of the third embodiment.
Figure 6D:
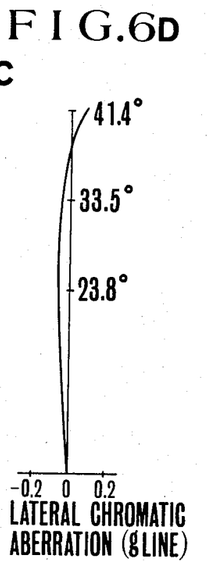
Figure 6E:
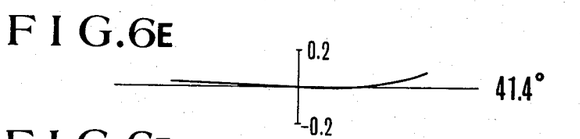
Figure 6F:
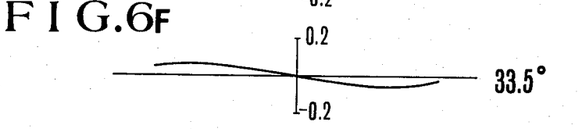
Figures 6G, 6H:
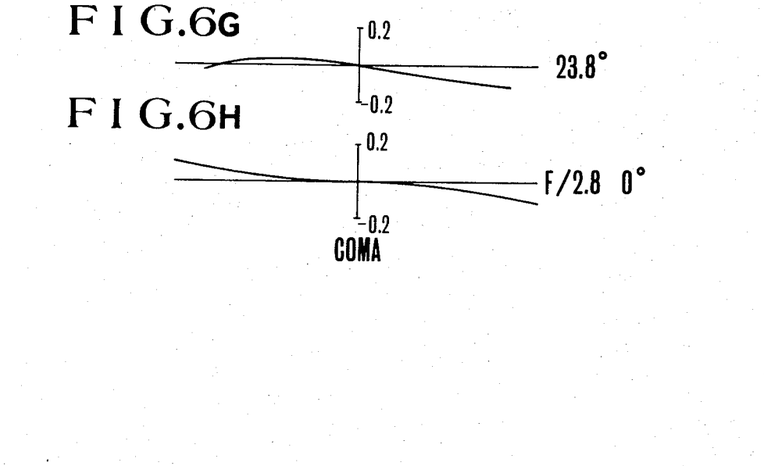

Below the numerical examples will be given. FIG. 1 shows the first embodiment of the lens in section. FIGS. 2(A) to (H) respectively show the spherical aberration, the coma, the astigmatism, the distortion and the lateral chromatic aberration for the object at the infinite distance. FIG. 3 shows the second embodiment in section. FIG. 5 shows the third embodiment in section. FIGS. 4(A) to (H) and FIGS. 6(A) to (H) respectively show the aberrations for the second and the third embodiments.

Embodiment 1:
Focal length f = 100  F No. = 2.8
Back focus bf = 157.9  Picture angle 2ω = 82.9°

| Radius of Curvature | Lens Thickness and Distance | Refractive Index (Nd) | Abbe's Number (νd) |
|---|---|---|---|
| $R_1$ 182.84 | $D_1$ 17.55 | $N_1$ 1.55963 | $\nu_1$ 61.2 |
| $R_2$ 759.17 | $D_2$ 0.41 | | |
| $R_3$ 167.27 | $D_3$ 5.71 | $N_2$ 1.59551 | $\nu_2$ 39.2 |
| $R_4$ 46.301 | $D_4$ 19.59 | | |
| $R_5$ 146.85 | $D_5$ 9.39 | $N_3$ 1.60342 | $\nu_3$ 38 |
| $R_6$ 239.1 | $D_6$ 5.31 | | |
| $R_7$ 227.26 | $D_7$ 3.67 | $N_4$ 1.691 | $\nu_4$ 54.8 |
| $R_8$ 55.325 | $D_8$ 10.03 | | |
| $R_9$ 125.15 | $D_9$ 59.88 | $N_5$ 1.7847 | $\nu_5$ 26.2 |
| $R_{10}$ −323.38 | $D_{10}$ 8.98 | | |
| $R_{11}$ 552.17 | $D_{11}$ 3.67 | $N_6$ 1.686 | $\nu_6$ 49.1 |
| $R_{12}$ 124.22 | $D_{12}$ 19.83 | $N_7$ 1.713 | $\nu_7$ 53.9 |
| $R_{13}$ −78.877 | $D_{13}$ 4.49 | | |
| $R_{14}$ −90.814 | $D_{14}$ 4.08 | $N_8$ 1.80518 | $\nu_8$ 25.4 |
| $R_{15}$ 173.22 | $D_{15}$ 3.84 | | |
| $R_{16}$ −413.99 | $D_{16}$ 10.06 | $N_9$ 1.72 | $\nu_9$ 50.2 |
| $R_{17}$ −81.051 | $D_{17}$ 0.41 | | |
| $R_{18}$ −542.06 | $D_{18}$ 8.62 | $N_{10}$ 1.72 | $\nu_{10}$ 50.2 |
| $R_{19}$ −138.16 | | | |

FI = −0.659F
FII = −2.763F
$(D_9 + D_{11} + D_{12})/L = 0.426$, L = 195.52
$|1/R_{13}| - |1/R_{14}| = 0.167/F$, $(N_7 - N_6)/R_{12} = 0.0217/F$

Embodiment 2:
Focal length f = 100  F No. = 2.8
Back focus bf = 152.7  Picture angle 2ω = 82.9°

| Radius of Curvature | Lens Thickness and Distance | Refractive Index (Nd) | Abbe's Number (νd) |
|---|---|---|---|
| $R_1$ 187.01 | $D_1$ 17.69 | $N_1$ 1.60311 | $\nu_1$ 60.7 |
| $R_2$ 789.96 | $D_2$ 0.61 | | |
| $R_3$ 176.1 | $D_3$ 5.72 | $N_2$ 1.62004 | $\nu_2$ 36.3 |
| $R_4$ 47.101 | $D_4$ 19.57 | | |
| $R_5$ 139.77 | $D_5$ 9.28 | $N_3$ 1.63636 | $\nu_3$ 35.4 |
| $R_6$ 380.28 | $D_6$ 5.52 | | |
| $R_7$ 495.58 | $D_7$ 3.68 | $N_4$ 1.6968 | $\nu_4$ 55.5 |
| $R_8$ 53.296 | $D_8$ 9.68 | | |
| $R_9$ 98.962 | $D_9$ 52.47 | $N_5$ 1.7552 | $\nu_5$ 27.5 |
| $R_{10}$ −305.7 | $D_{10}$ 8.99 | | |
| $R_{11}$ 808.23 | $D_{11}$ 3.68 | $N_6$ 1.6172 | $\nu_6$ 54 |
| $R_{12}$ 102.01 | $D_{12}$ 17.9 | $N_7$ 1.713 | $\nu_7$ 53.9 |
| $R_{13}$ −80.863 | $D_{13}$ 4.45 | | |
| $R_{14}$ −91.034 | $D_{14}$ 4.09 | $N_8$ 1.80518 | $\nu_8$ 25.4 |
| $R_{15}$ 161.11 | $D_{15}$ 3.85 | | |
| $R_{16}$ −334.36 | $D_{16}$ 10.83 | $N_9$ 1.713 | $\nu_9$ 53.9 |
| $R_{17}$ −78.922 | $D_{17}$ 0.41 | | |
| $R_{18}$ −553.61 | $D_{18}$ 10.46 | $N_{10}$ 1.713 | $\nu_{10}$ 53.9 |
| $R_{19}$ −127.5 | | | |

FI = −0.612F
FII = −3.227F
$(D_9 + D_{11} + D_{12})/L = 0.392$, L = 188.88
$|1/R_{13}| - |1/R_{14}| = 0.138/F$, $(N_7 - N_6)/R_{12} = 0.0939/F$

Embodiment 3:
Focal length f = 100  F No. = 2.8
Back focus bf = 154.5  Picture angle 2ω = 82.9°

| Radius of Curvature | Lens Thickness and Distance | Refractive Index (Nd) | Abbe's Number (νd) |
|---|---|---|---|
| $R_1$ 247.45 | $D_1$ 20.65 | $N_1$ 1.65844 | $\nu_1$ 50.9 |
| $R_2$ 845.82 | $D_2$ 0.41 | | |
| $R_3$ 126.3 | $D_3$ 5.71 | $N_2$ 1.68893 | $\nu_2$ 31.1 |
| $R_4$ 48.283 | $D_4$ 16.18 | | |
| $R_5$ 135.01 | $D_5$ 11.8 | $N_3$ 1.68893 | $\nu_3$ 31.1 |
| $R_6$ −2725.7 | $D_6$ 4.92 | | |

-continued

Embodiment 3:

Focal length f = 100, F No. = 2.8
Back focus bf = 154.5, Picture angle 2ω = 82.9°

| | Radius of Curvature | Lens Thickness and Distance | Refractive Index (Nd) | Abbe's Number (νd) |
|---|---|---|---|---|
| $R_7$ | −717.11 | $D_7$ 3.67 | $N_4$ 1.7725 | $\nu_4$ 49.6 |
| $R_8$ | 53.367 | $D_8$ 9.91 | | |
| $R_9$ | 94.059 | $D_9$ 59.05 | $N_5$ 1.69895 | $\nu_5$ 30.1 |
| $R_{10}$ | −188.72 | $D_{10}$ 8.99 | | |
| $R_{11}$ | 878.83 | $D_{11}$ 3.67 | $N_6$ 1.61484 | $\nu_6$ 51.2 |
| $R_{12}$ | 123.89 | $D_{12}$ 14.23 | $N_7$ 1.7725 | $\nu_7$ 49.6 |
| $R_{13}$ | −87.013 | $D_{13}$ 4.59 | | |
| $R_{14}$ | −88.33 | $D_{14}$ 4.08 | $N_8$ 1.80518 | $\nu_8$ 25.4 |
| $R_{15}$ | 153.87 | $D_{15}$ 3.84 | | |
| $R_{16}$ | −352.69 | $D_{16}$ 14.16 | $N_9$ 1.6968 | $\nu_9$ 55.5 |
| $R_{17}$ | −79.84 | $D_{17}$ 0.41 | | |
| $R_{18}$ | −502.32 | $D_{18}$ 13.68 | $N_{10}$ 1.6968 | $\nu_{10}$ 55.5 |
| $R_{19}$ | −130.1 | | | |

FI = −0.528f
FII = −4.102F
$(D_9 + D_{11} + D_{12})/L = 0.382$, L = 198.95
$||1/R_{13}| - |1/R_{14}|| = 0.017/F$, $(N_7 - N_6)/R_{12} = 0.1273/F$

Third Degree Aberration — Embodiment 1

| R | L | T | SA | CM |
|---|---|---|---|---|
| 1 | 0.003963 | 0.004363 | 0.037638 | 0.041446 |
| 2 | 0.000754 | −0.007706 | 0.001224 | −0.012507 |
| 3 | 0.004021 | 0.009759 | −0.000872 | −0.002117 |
| 4 | −0.030787 | 0.005259 | −5.824463 | 0.994928 |
| 5 | 0.018531 | 0.005816 | 1.110252 | 0.348472 |
| 6 | −0.012652 | −0.008649 | −0.359626 | −0.245836 |
| 7 | 0.009756 | 0.006536 | 0.426107 | 0.285464 |
| 8 | −0.036030 | 0.000116 | −20.166995 | 0.064794 |
| 9 | 0.070417 | 0.008919 | 10.337861 | 1.309421 |
| 10 | 0.003432 | −0.022186 | −0.002136 | 0.013807 |
| 11 | 0.010255 | 0.010715 | 0.189989 | 0.198522 |
| 12 | −0.002951 | −0.000957 | 0.104650 | 0.033957 |
| 13 | 0.048313 | −0.005443 | 21.507839 | −2.423156 |
| 14 | −0.101521 | 0.012553 | −16.444745 | 2.033404 |
| 15 | −0.056516 | −0.029695 | −2.923547 | −1.536103 |
| 16 | 0.006192 | 0.011245 | 0.094842 | 0.172250 |
| 17 | 0.038935 | −0.004368 | 6.437307 | −0.722154 |
| 18 | −0.011278 | 0.008656 | −0.241718 | 0.185524 |
| 19 | 0.035282 | −0.004174 | 6.813542 | −0.806053 |
| Σ | −0.001886 | 0.000759 | 1.097151 | −0.065937 |

| R | AS | PT | DS |
|---|---|---|---|
| 1 | 0.045639 | 0.196247 | 0.266357 |
| 2 | 0.127808 | −0.047246 | −0.823245 |
| 3 | −0.005137 | 0.223134 | 0.529142 |
| 4 | −0.169952 | −0.806119 | 0.166731 |
| 5 | 0.109374 | 0.256268 | 0.114763 |
| 6 | −0.168051 | −0.157397 | −0.222473 |
| 7 | 0.191243 | 0.179805 | 0.248578 |
| 8 | −0.000208 | −0.738602 | 0.002374 |
| 9 | 0.165855 | 0.351324 | 0.065507 |
| 10 | −0.089247 | 0.135964 | −0.301977 |
| 11 | 0.207439 | 0.073687 | 0.293752 |
| 12 | 0.011018 | 0.007526 | 0.006017 |
| 13 | 0.273002 | 0.527689 | −0.090209 |
| 14 | −0.251432 | −0.491152 | 0.091821 |
| 15 | −0.807106 | −0.257503 | −0.559372 |
| 16 | 0.312836 | −0.101115 | 0.384525 |
| 17 | 0.081013 | 0.516467 | −0.067027 |
| 18 | −0.142394 | −0.077224 | 0.168561 |
| 19 | 0.095357 | 0.302974 | −0.047123 |
| Σ | −0.012943 | 0.094728 | 0.226703 |

L: Longitudinal Chromatic Aberration
T: Lateral Chromatic Aberration
SA: Spherical Aberration
CM: Coma
AS: Astigmatism
PT: Petzval Sum
DS: Distortion

Third Degree Aberration — Embodiment 2

| R | L | T | SA | CM |
|---|---|---|---|---|
| 1 | 0.004097 | 0.004747 | 0.035903 | 0.041599 |
| 2 | 0.000937 | −0.008219 | 0.001914 | −0.016793 |
| 3 | 0.003905 | 0.011307 | −0.002127 | −0.006158 |
| 4 | −0.034019 | 0.005138 | −5.811660 | 0.877700 |
| 5 | 0.021544 | 0.006512 | 1.270587 | 0.384075 |
| 6 | −0.009651 | −0.011231 | −0.121591 | −0.141499 |
| 7 | 0.005708 | 0.007667 | 0.098819 | 0.132729 |
| 8 | −0.037373 | −0.000062 | −23.663035 | −0.038960 |
| 9 | 0.075405 | 0.007479 | 15.073901 | 1.495191 |
| 10 | 0.005055 | −0.020637 | −0.003804 | 0.015530 |
| 11 | 0.006492 | 0.009018 | 0.085384 | 0.118611 |
| 12 | 0.002894 | 0.000872 | 0.549403 | 0.165525 |
| 13 | 0.044816 | −0.005690 | 18.762934 | −2.382322 |
| 14 | −0.095443 | 0.012952 | −14.889734 | 2.020527 |
| 15 | −0.054477 | −0.029642 | −2.782954 | −1.514236 |
| 16 | 0.004106 | 0.010140 | 0.046864 | 0.115721 |
| 17 | 0.033750 | −0.004034 | 5.652043 | −0.675610 |
| 18 | −0.009140 | 0.008062 | −0.174305 | 0.153743 |
| 19 | 0.032148 | −0.003405 | 7.008504 | −0.742305 |
| Σ | 0.000752 | 0.000974 | 1.137048 | 0.003069 |

| R | AS | PT | DS |
|---|---|---|---|
| 1 | 0.048200 | 0.201212 | 0.288984 |
| 2 | 0.147322 | −0.047632 | −0.874568 |
| 3 | −0.017832 | 0.217376 | 0.577799 |
| 4 | −0.132554 | −0.812718 | 0.142759 |
| 5 | 0.116099 | 0.278290 | 0.119216 |
| 6 | −0.164666 | −0.102281 | −0.310652 |
| 7 | 0.178275 | 0.082878 | 0.350766 |
| 8 | −0.000064 | −0.770651 | −0.001269 |
| 9 | 0.148309 | 0.434850 | 0.057844 |
| 10 | −0.063404 | 0.140769 | −0.315846 |
| 11 | 0.164768 | 0.047228 | 0.294494 |
| 12 | 0.049870 | 0.033907 | 0.025240 |
| 13 | 0.302482 | 0.514820 | −0.103772 |
| 14 | −0.274184 | −0.490050 | 0.103706 |
| 15 | −0.823913 | −0.276902 | −0.598965 |
| 16 | 0.285752 | −0.124505 | 0.398169 |
| 17 | 0.080758 | 0.527481 | −0.072705 |
| 18 | −0.135606 | −0.075197 | 0.185936 |
| 19 | 0.078621 | 0.326520 | −0.042910 |
| Σ | −0.011766 | 0.105394 | 0.224225 |

Third Degree Aberration — Embodiment 3

| R | L | T | SA | CM |
|---|---|---|---|---|
| 1 | 0.003965 | 0.006896 | 0.015800 | 0.027480 |
| 2 | 0.000726 | −0.010251 | 0.000532 | −0.007521 |
| 3 | 0.009484 | 0.011389 | 0.019368 | 0.023258 |
| 4 | −0.041495 | 0.006341 | −5.487682 | 0.838654 |
| 5 | 0.024947 | 0.007116 | 1.210353 | 0.345244 |
| 6 | −0.000515 | −0.016926 | −0.000030 | −0.000976 |
| 7 | −0.000921 | 0.011253 | 0.000065 | −0.000792 |
| 8 | −0.042836 | 0.000718 | −23.784815 | 0.398842 |
| 9 | 0.066089 | 0.004882 | 15.967393 | 1.179517 |
| 10 | 0.014763 | −0.018042 | 0.015034 | −0.018372 |
| 11 | 0.005933 | 0.009526 | 0.050508 | 0.081096 |
| 12 | 0.005270 | 0.001830 | 0.486228 | 0.168808 |
| 13 | 0.052625 | −0.007143 | 20.959923 | −2.845129 |
| 14 | −0.103080 | 0.013536 | −18.741704 | 2.461082 |
| 15 | −0.054817 | −0.028925 | −2.710023 | −1.429998 |
| 16 | 0.003546 | 0.009592 | 0.34759 | 0.094012 |
| 17 | 0.033498 | −0.003852 | 6.229805 | −0.716328 |
| 18 | −0.009982 | 0.007560 | −0.250529 | 0.189744 |
| 19 | 0.030961 | −0.003166 | 6.953009 | −0.710969 |
| Σ | −0.001839 | 0.002335 | 0.967985 | 0.077652 |

| R | AS | PT | DS |
|---|---|---|---|
| 1 | 0.047796 | 0.160445 | 0.362190 |
| 2 | 0.106226 | −0.046939 | −0.837398 |
| 3 | 0.027929 | 0.322975 | 0.421383 |
| 4 | −0.128167 | −0.844830 | 0.148698 |
| 5 | 0.098478 | 0.302133 | 0.114271 |
| 6 | −0.032060 | 0.014965 | −0.561777 |

-continued

| Third Degree Aberration | | Embodiment 3 | |
| --- | --- | --- | --- |
| 7 | 0.009680 | −0.060775 | 0.624304 |
| 8 | −0.006688 | −0.816653 | 0.013806 |
| 9 | 0.087131 | 0.437385 | 0.038746 |
| 10 | 0.022452 | 0.217994 | −0.293840 |
| 11 | 0.130207 | 0.043324 | 0.278620 |
| 12 | 0.058606 | 0.044461 | 0.035783 |
| 13 | 0.386202 | 0.500871 | −0.120413 |
| 14 | −0.323179 | −0.504966 | 0.108749 |
| 15 | −0.754567 | −0.289877 | −0.551122 |
| 16 | 0.254335 | −0.116434 | 0.373071 |
| 17 | 0.082366 | 0.514347 | −0.068612 |
| 18 | −0.143707 | −0.081752 | 0.170756 |
| 19 | 0.072699 | 0.315638 | −0.039709 |
| Σ | −0.004261 | 0.112313 | 0.217506 |

What is claimed is:

1. A compact type retrofocus lens comprising:
   a first positive meniscus lens having a convex surface at the object side;
   a second negative meniscus lens having a convex surface at the object side;
   a third positive lens;
   a fourth negative lens;
   a fifth bi-convex lens the radius of curvature of whose lens surface at the object side is smaller;
   a diaphragm;
   a sixth combined positive lens which has a convex surface with convergent effect at the object side and the radius of curvature of whose lens surface at the image side is smaller;
   a seventh bi-concave lens the radius of curvature of whose lens surface at the object side is smaller;
   an eighth positive meniscus lens having a concave surface at the object side; and
   ninth positive meniscus lens having a concave surface at the object side;
   in sequence from the object side, whereby the sign of the radius of curvature of the image side lens surface of the third is same as that of the object side lens surface and the following relations are established:

(1) $FI < 0,\ 0.5F \leq |FI| \leq 0.75F$ (2) $FII < 0,\ 2.5F \leq |FII| \leq 4.5F$ (3) $0.32 \leq (D_9 + D_{11} + D_{12})/L \leq 0.44$ (4) $0 < |1/R_{13}| - |1/R_{14}| \leq 0.18/F$ (5) $0.02F \leq D_{13} \leq 0.1F$ (6) $0.015/F \leq (N_7 - N_6)/R_{12} \leq 0.135/F$ wherein:
   F: Focal length of the whole system
   FI: Compound focal length of the first lens to the fourth lens
   FII: Compound focal length of the first lens to the fifth lens
   L: Total lens length from the object side surface of the first lens to the image side surface of the ninth lens
   $D_9$: Thickness of the fifth lens along the optical axis
   $D_{11} + D_{12}$: Thickness of the sixth combined lens along the optical axis
   $N_6$, $N_7$: Refractive index (d line) of the negative lens and the positive lens in the sixth lens
   $D_{13}$: Distance between the surface of the sixth and the seventh lens.

2. A compact type retrofocus lens in accordance with claim 1, wherein further the relations:

(7) $1.68 \leq N_4$ (8) $48 \leq \nu_1 \cdot \nu_4 \cdot \nu_6$ and $\nu_7 \leq 63$ (9) $30 \leq \nu_2$ and $\nu_3 \leq 41,\ 26 \leq \nu_5 \leq 32$ (10) $|\nu_6 - \nu_7| \leq 5$ are established; wherein:
   $\nu_1, \nu_2, \nu_3, \nu_4$ and $\nu_5$: Abbe's number of the first, the second, the third, the fourth and the fifth lens
   $\nu_6$: Abbe's number of the negative lens in the sixth lens
   $\nu_7$: Abbe's number of the positive lens in the sixth lens
   $N_4$: Refractive index (d line) of the fourth lens.

* * * * *